United States Patent [19]

Tsunoda et al.

[11] Patent Number: 5,221,923
[45] Date of Patent: Jun. 22, 1993

[54] RADIO COMMUNICATION APPARATUS CAPABLE OF GENERATING A COMMON CALL TONE REGARDLESS OF CALL NUMBERS INDICATED BY A CALL SIGNAL

[75] Inventors: Kazuyuki Tsunoda; Masahiro Matai, both of Tokyo, Japan

[73] Assignee: NEC Corporation, Tokyo, Japan

[21] Appl. No.: 795,260

[22] Filed: Nov. 19, 1991

Related U.S. Application Data

[63] Continuation of Ser. No. 290,010, Dec. 27, 1988, abandoned.

[30] Foreign Application Priority Data

Dec. 25, 1987 [JP] Japan .................. 62-326801

[51] Int. Cl.⁵ ............................................. H04Q 7/00
[52] U.S. Cl. ........................... 340/825.44; 340/311.1; 455/38.2
[58] Field of Search ............ 340/825.44, 825.48, 340/311.1, 328; 455/38, 38.1, 38.2; 379/56, 57

[56] References Cited

U.S. PATENT DOCUMENTS

| | | | |
|---|---|---|---|
| 4,010,461 | 3/1977 | Stodolski | 340/825.48 |
| 4,091,373 | 5/1978 | Nakamura | 455/38 |
| 4,160,240 | 7/1979 | Partipilo | 340/825.44 |
| 4,237,448 | 12/1980 | Weinberg | 340/825.44 |
| 4,249,165 | 2/1981 | Mori | 340/825.44 |
| 4,330,780 | 5/1982 | Masaki | 340/825.44 |
| 4,336,524 | 6/1982 | Levine | 340/825.44 |
| 4,403,212 | 9/1983 | Masaki | 340/825.48 |
| 4,490,579 | 12/1984 | Godoshian | 379/57 |
| 4,536,761 | 8/1985 | Tsunoda et al. | 340/825.44 |

FOREIGN PATENT DOCUMENTS

| | | | |
|---|---|---|---|
| 71377 | 10/1987 | Australia . | |
| 2118337 | 10/1983 | United Kingdom | 340/311.1 |

Primary Examiner—Donald J. Yusko
Assistant Examiner—Edwin C. Holloway, III
Attorney, Agent, or Firm—Sughrue, Mion, Zinn, Macpeak & Seas

[57] ABSTRACT

In a radio communication apparatus for selectively receiving call signals indicative of call numbers, respectively, a decoder receives, in cooperation with a P-ROM, each of the call signals as a received signal and processes the received signal into a common call tone signal representative of reception of the received signal regardless of the call numbers. The decoder makes a tone generator generate a common tone in response to the common call tone signal to indicate arrival of reception of one of the call signals. When a manual operable switch is operated, the decoder makes the tone generator stop generation of the common tone and classify the received signal into one of individual tone signals corresponding to the respective call numbers. Subsequently, the decoder makes the tone generator generate a particular tone indicating the call number of the received signal in question. When the switch is again operated, the decoder makes the tone generator stop generation of the particular tone.

7 Claims, 4 Drawing Sheets

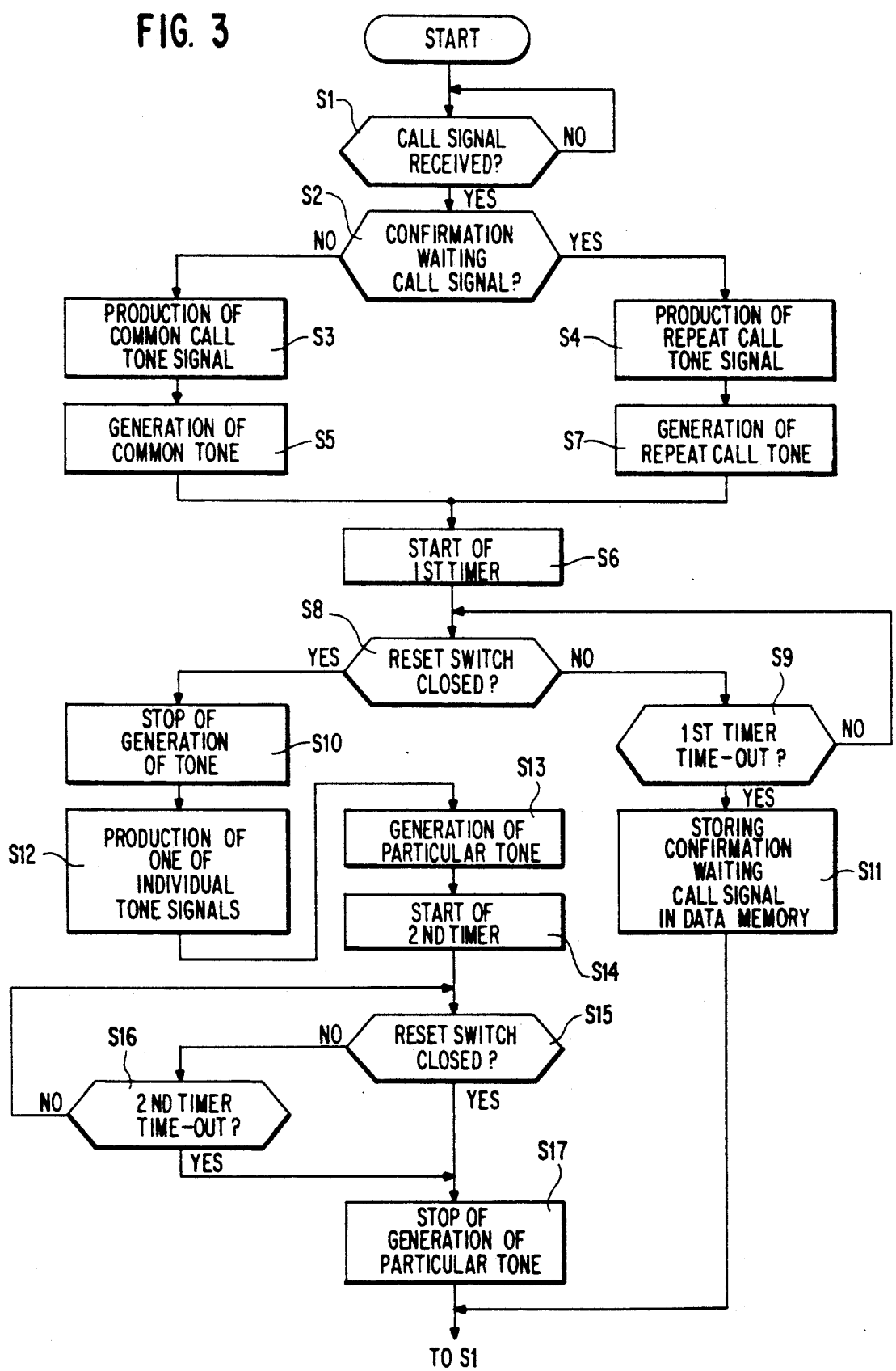

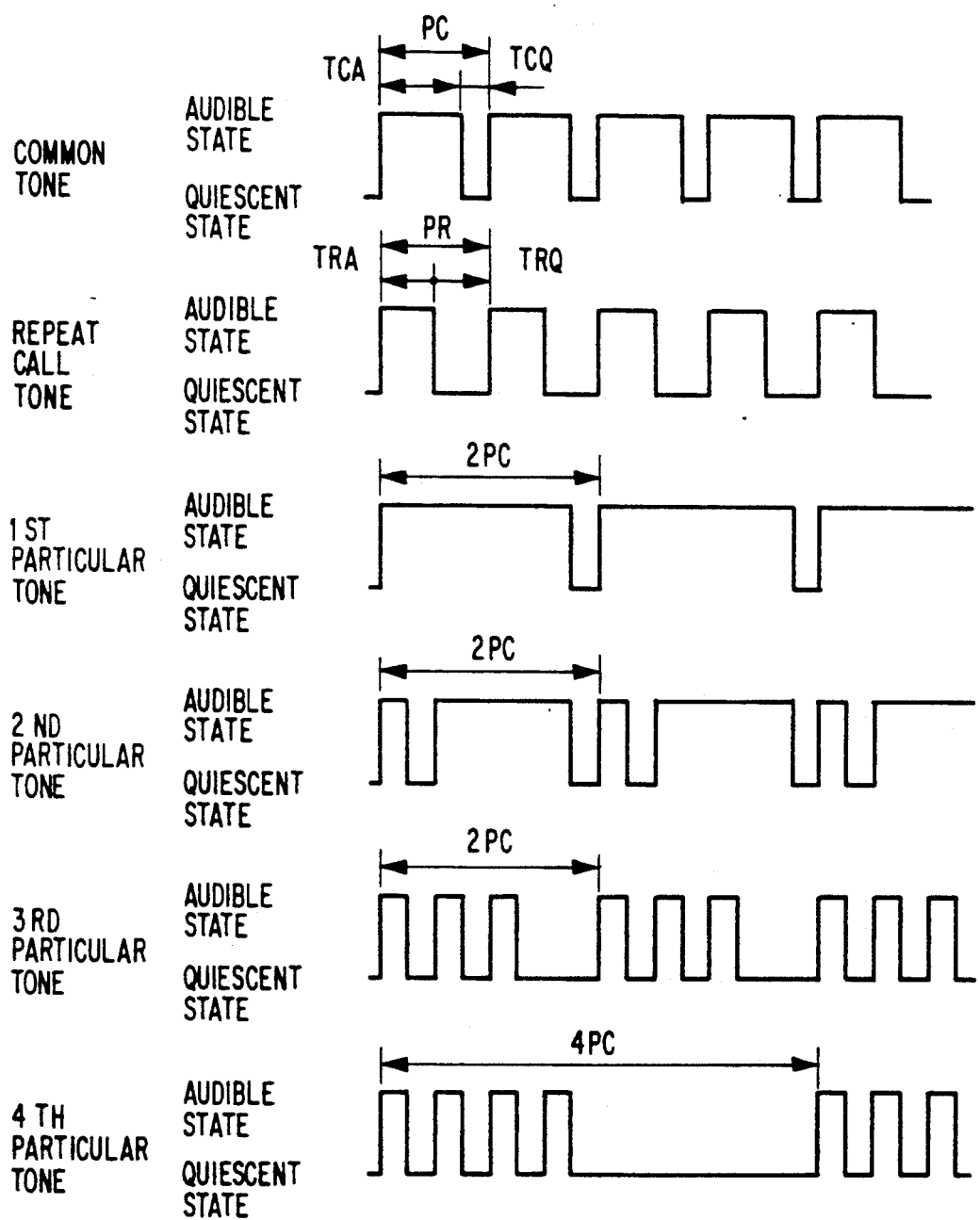

RADIO COMMUNICATION APPARATUS CAPABLE OF GENERATING A COMMON CALL TONE REGARDLESS OF CALL NUMBERS INDICATED BY A CALL SIGNAL

This is a continuation of application Ser. No. 07/290,010 filed Dec. 27, 1988, now abandoned.

BACKGROUND OF THE INVENTION

This invention relates to a radio communication apparatus for selectively receiving a plurality of call signals indicative of a plurality of call numbers, respectively. The radio communication apparatus may be a radio paging receiver, a transceiver, or the like although description will be mainly made about the radio paging receiver.

A radio paging receiver of the type described, deals with a plurality of call numbers. The radio paging receiver is for selectively receiving call signals which carry the call numbers, respectively.

The radio paging receiver comprises a receiving circuit for receiving each of the call signals as a received signal. More specifically, the received signal is produced as a particular reception signal in response to one of the call signals that indicates one of the call numbers.

In a conventional radio paging receiver, a processing circuit is connected to the receiving circuit to process or classify the received signal into one of a plurality of individual tone signals which corresponds to the call numbers, respectively. The above-mentioned one of the individual tone signals indicates reception of the particular reception signal.

Connected to the processing circuit, a controlling circuit controls a tone generator to make the tone generator generate a particular one of audible tones as a particular tone in response to the above-mentioned one of the individual tone signals. The particular tone indicates reception of the particular reception signal. In other words, the particular tone indicates the call number of the particular reception signal.

Thus, the conventional radio paging receiver carries out not only indication of the call number of the particular reception signal but also indication of arrival of each of the call signals by the use of the particular tone. In other words, indication of the call number of the particular reception signal and indication of arrival of a certain one of the call signals are simultaneously carried out by the particular tone.

In order to avoid influence of an ambient noise, it is necessary to make the tone generator generate a loud tone as each of the audible tones. For example, each of the audible tones has a large sound pressure level which is higher than seventy-five decibels when the sound pressure level of each of the audible tones is measured at a position spaced from the radio paging receiver by thirty centimeters. That is, the radio paging receiver generates a considerably loud tone when the receiver is positioned at a comparatively quiet place.

However, a possessor of the receiver cannot stop such a loud tone until the possessor can recognize the call number corresponding to the tone in question. This is because the tone serves as both the indication of arrival of any one of the call signals and the indication of the call number of the call signal received as the particular reception signal.

Inasmuch as a long time interval is necessary to recognize the call number corresponding to the tone in question when the receiver can deal with an increased number of call numbers, a loud tone is inevitably generated for a long time. Thus, the conventional radio paging receiver unavoidably gives any trouble to those around the receiver.

SUMMARY OF THE INVENTION

It is therefore an object of this invention to provide a radio communication apparatus which is capable of generating a call tone without giving any trouble to those around radio communication apparatus no matter where the radio communication apparatus is positioned.

It is another object of this invention to provide a radio communication apparatus of the type described, for which a short time interval is sufficient to indicate arrival of call signals even for an increased number of call numbers indicated by the respective call signals.

It is still another object of this invention to provide a radio communication apparatus of the type described, which is suitable for carrying out indication of the call numbers of the call signals by using comparatively quiet tones.

Other objects of this invention will become clear as the description proceeds.

A radio communication apparatus to which this invention is applicable is for selectively receiving a plurality of call signals indicative of a plurality of call numbers, respectively. The radio communication apparatus includes receiving means for receiving each of the call signals as a received signal. According to this invention, the radio communication apparatus comprises processing means connected to the receiving means for processing the received signal into a common call tone signal representative of reception of the received signal regardless of the call numbers, tone generating means for generating a plurality of audible tones, and controlling means connected to the processing means for controlling the tone generating means in response to the common call tone signal to make the tone generating means generate one of the audible tones that indicates reception of the received signals as a common tone.

BRIEF DESCRIPTION OF THE DRAWING

FIG. 3 is a flow chart for use in describing operation of the radio paging receiver illustrated in FIG. 1; and FIG. 4 is a time chart for use in describing a tone generating operation of the radio paging receiver illustrated in FIG. 1.

DESCRIPTION OF THE PREFERRED EMBODIMENT

Figure 1:
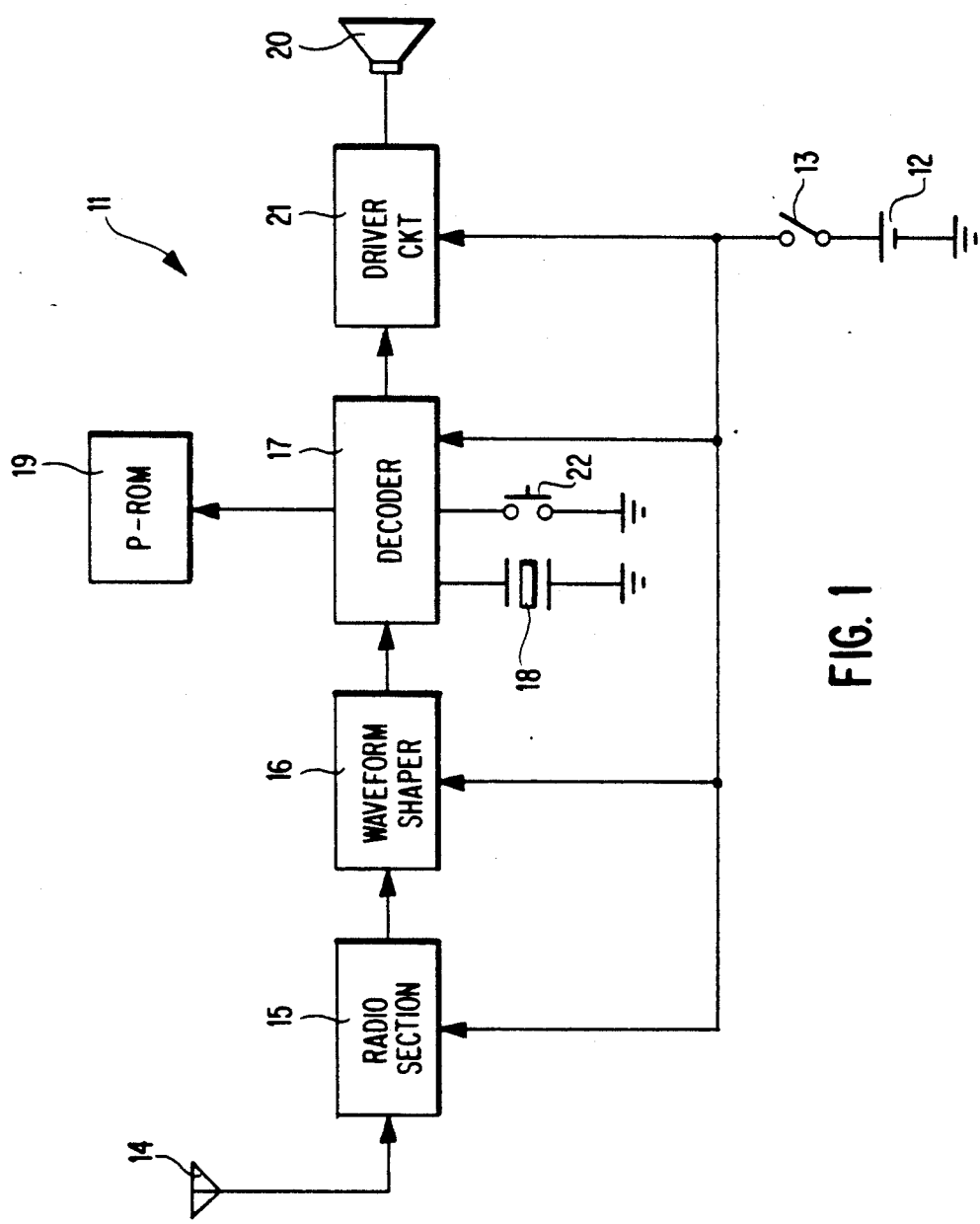
FIG. 1 is a block diagram of a radio paging receiver according to an embodiment of this invention.

Referring to FIG. 1, a radio paging receiver 11 according to a preferred embodiment of this invention is for selectively receiving a plurality of call signals indicative of a plurality of call numbers, respectively. Each of the call signals is transmitted as a radio signal from a transmitting station (not shown).

The paging receiver 11 is for use in combination with a battery 12 for generating electric power. The paging receiver 11 is coupled to the battery 12 through a manually operable power source switch 13 and activated by the electric power when the power source switch 13 is closed to an on state. Description will hereinafter be made only as regards a case where the power source switch 13 is put into the on state.

The radio signal is picked up by an antenna 14 and supplied to a radio section 15. When the radio section 15 is activated by the electric power supplied from the battery 12 through the switch 13, the radio section 15 converts or demodulates the radio signal into a baseband or demodulated signal. The demodulated signal is supplied to a waveform shaper 16. The waveform shaper 16 is also activated by the electric power and shapes a waveform of the demodulated signal into a shaped signal of a digital waveform. The shaped signal is supplied to a decoder 17.

When the decoder 17 is activated by the electric power, the decoder 17 cooperates with a quartz crystal oscillator 18 and a P-ROM (programmable read-only memory) 19 in response to the shaped signal to produce various tone signals in the manner which will later be described. A loudspeaker 20 is connected to the decoder 17 through a driver circuit 21 of, for example, an amplifier. Under the control of the decoder 17, the loudspeaker 20 generates a plurality of audible tones with the driver circuit 21 activated by the electric power. That is, the loudspeaker 20 serves, in cooperation with the driver circuit 21, as a tone generator for generating a plurality of audible tones. A manually operable reset switch 22 is connected to the decoder 17 for producing a tone stop instruction signal when the reset switch 22 is closed to an on state by a possessor of the paging receiver 11. The tone stop instruction signal will become clear as the description proceeds.

Figure 2:
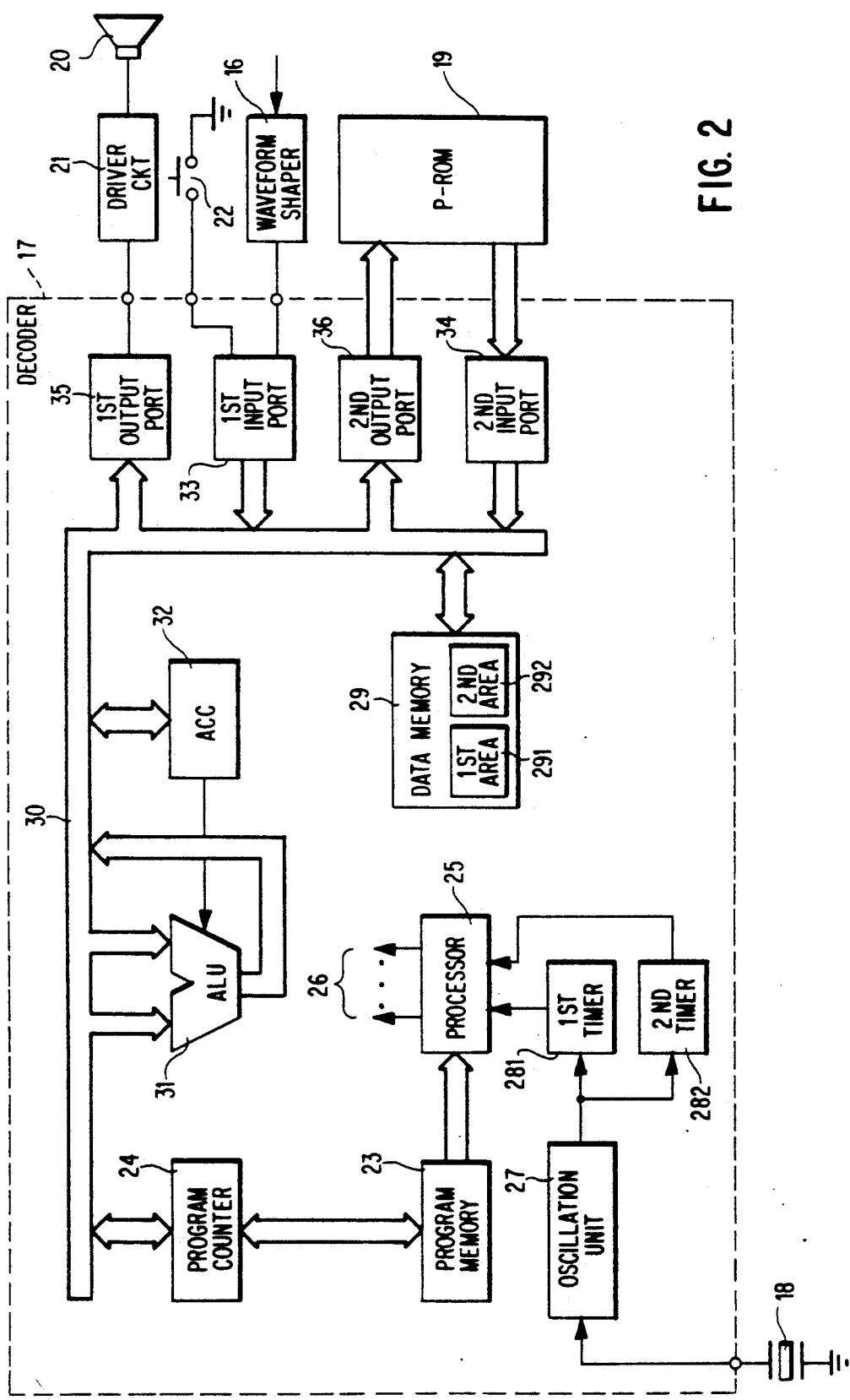
FIG. 2 is a block diagram for use in describing a part of the radio paging receiver illustrated in FIG. 1.

Turning to FIG. 2, description will proceed to a detailed structure of the decoder 17. The decoder 17 is implemented by a one-chip central processing unit (CPU). The decoder 17 comprises a program memory 23 for memorizing a program comprising a succession of instructions. The program defines operation of the decoder 17 after the decoder 17 is supplied with the shaped signal from the waveform shaper 16.

A program counter 24 is connected to the program memory 23 for use in accessing the program memory 23 by an address signal, namely, by a count kept in the program counter 24. The program counter 24 is usually counted up by one at every instruction but sometimes rewritten by particular instructions, such as jump instructions or the like. Thus, the program memory 23 produces the instructions in accordance with the address signal kept in the program counter 24.

Responsive to the instructions, a processor 25 is put into operation in synchronism with a clock pulse sequence to deliver various kinds of control signals 26 to structural elements included in the decoder 17. The clock pulse sequence is produced by a combination of an oscillation unit 27 connected to the quarts crystal oscillator 18 and first and second timers 281 and 282 each of which is connected between the oscillation unit 27 and the processor 25.

The program counter 24 is connected to a data memory 29 through a data bus 30. The data memory 29 has first and second areas 291 and 292 and a remaining area. The first and the second areas 291 and 292 will later be described. The address signal kept in the program counter 24 can be delivered to the remaining area of the data memory 29 under the control of the processor 25. Additionally, the program counter 24 is supplied with a jump address signal representative of a jump address through the data bus 30. An arithmetic logic unit 31 labelled "ALU" and an accumulator 32 labelled "ACC" are also connected to the data bus 30. The arithmetic logic unit 31 and the accumulator 32 will later be described.

The waveform shaper 16 and the reset switch 22 is connected to the data bus 30 through a first input port 33. The P-ROM 19 is connected to the data bus 30 through a second input port 34. The data bus 30 is connected to the driver circuit 21 through a first output port 35 and is also connected to the P-ROM 19 through a second output port 36.

Turning to FIG. 3 with reference to FIG. 2 continued, description will proceed to operation of the decoder 17. When the decoder 17 is supplied with the shaped signal from the waveform shaper 16, the decoder 17 judges at a first stage S1, in cooperation with the P-ROM 19, whether or not the shaped signal is one of the call signals. That is, the decoder 17 judges with reference to a memorized content of the P-ROM 19 whether or not one of the call signals is received. The P-ROM 19 memorizes, as the memorized content, a plurality of directory number signals of a plurality of directory numbers indicated by the responsive call signals.

More specifically, the P-ROM 19 is accessed under the control of the processor 25 so as to derive one of the directory number signals at a time. Under the control of the processor 25 and through the accumulator 32, each of the directory number signals is compared by the use of the arithmetic logic unit 31 with the shaped signal sent through the first input port 33 from the waveform shaper 16. When the shaped signal is coincident with one of the directory number signals, the arithmetic logic unit 31 supplies the shaped signal to the data bus 30 as a received signal. Otherwise, the first stage S1 is repeatedly carried out until each of the call signals is received. Thus, the processor 25 serves, in combination with the P-ROM 19 and the arithmetic logic unit 31, as a receiving arrangement at the first stage S1. The receiving arrangement is for receiving each of the call signals as a received signal. The first stage S1 proceeds to a second stage S2.

At the second stage S2, the processor 25 judges whether or not the received signal is a confirmation waiting call signal which is already received by the paging receiver 11 (FIG. 1) as a preceding received signal preceding the received signal in question and which is not yet confirmed by the possessor of the paging receiver 11. The confirmation waiting call signal will become more clear as the description proceeds. Such a confirmation waiting call signal is memorized in the first area 291 of the data memory 29.

More specifically, the first area 291 of the data memory 29 is accessed under the control of the processor 25 so as to derive the confirmation waiting call signal. Under the control of the processor 25 and through the accumulator 32, the arithmetic logic unit 31 compares the received signal received from the data bus 30 with the confirmation waiting call signal. When the received signal is not coincident with the confirmation waiting call signal, the second stage S2 is followed by a third stage S3 which will presently be described. When the received signal is coincident with the confirmation waiting call signal, the second stage S2 is succeeded by a fourth stage S4 which will later be described.

At the third stage S3, the processor 25 makes the arithmetic logic unit 31 process the received signal into a common call tone signal representative of reception of the received signal regardless of the call number of the received signal in question. The common call tone signal is stored into the second area 292 of the data memory 29. That is, production of the common call tone signal is carried out at the third stage S3.

Thus, the processor 25 acts in cooperation with the arithmetic logic unit 31 as a processing arrangement at the third stage S3. The processing arrangement is connected to the receiving arrangement for processing the received signal into a common call tone signal representative of reception of the received signal regardless of the call numbers. The third stage S3 proceeds to a fifth stage S5.

At the fifth stage S5, the processor 25 reads the common call tone signal out of the second area 292 of the data memory 29 and delivers the common call tone signal to the loudspeaker 20 through the data bus 30, the first output port 35, and the driver circuit 21. As a result, the loudspeaker 20 generates one of the audible tones. This one of the audible tones indicates reception of the received signals as the common tone. The common tone has a sound pressure level which is higher than seventy-five decibels when the sound pressure level is measured at a position spaced from the paging receiver 11 by thirty centimeters.

Thus, the processor 25 serves, in combination with the second area 292 of the data memory 29 and the first output port 35, as a controlling arrangement at the fifth stage S5. The controlling arrangement is connected to the processing arrangement for controlling the tone generator (namely, a combination of the loudspeaker 20 and the driver circuit 21) in response to the common call tone signal to make the tone generator generate one of the audible tones that indicates reception of the received signals as a common tone. The fifth stage S5 is succeeded by a sixth stage S6 which will later b described.

Turning to FIG. 4, an example of the common tone is illustrated along a first or top line. The common tone has an audible state of a predetermined time interval Tca and a quiescent state of another predetermined time interval Tcq. The audible and the quiescent states periodically appears in the common tone at a predetermined period Pc.

Turning back to FIGS. 2 and 3, description will now be made as regards operation carried out at the fourth stage S4. When the received signal is coincident with the confirmation waiting call signal at the second stage S2, the processor 25 erases the confirmation waiting call signal out of the first area 291 of the data memory 29 at the fourth stage S4. Subsequently, the processor 25 makes the arithmetic logic unit 31 process the received signal into a repeat call tone signal representative of repeated reception of the received signal regardless of the call number of the received signal in question. The repeat call tone signal is stored into the second area 292 of the data memory 29. Thus, the repeat call tone signal is produced at the fourth stage S4. The fourth stage S4 is followed by a seventh stage S7.

At the seventh stage S7, the processor 25 reads the repeat call tone signal out of the second area 292 of the data memory 29 and supplies the repeat call tone signal to the loudspeaker 20 through the first output port 35 and the driver circuit 21. As a result, the loudspeaker 20 generates a repeat call tone which indicates repeated reception of the received signal. In this event, the loudspeaker 20 generates the repeat call tone having a sound pressure level which is similar to that of the common tone.

Turning again to FIG. 4, an example of the repeat call tone is illustrated along a second line. The repeat call tone has an audible state of a preselected time interval Tra and a quiescent state of another preselected time interval Trq. The audible and the quiescent states periodically appears in the repeat call tone at a preselected period Pr which is equal to the predetermined period Pc of the common call tone illustrated along the first line.

Turning back to FIGS. 2 and 3, the seventh stage S7 is followed by the sixth stage S6. At the sixth stage S6, the processor 25 makes the first timer 281 start operation of the first timer 281 when the processor 25 makes the tone generator generate either the common tone or the repeat call tone. The first timer 281 produces a first time-out signal when a first predetermined time duration lapses after operation of the first timer 281 is started. The first predetermined time duration may be several seconds long. The sixth stage S6 proceeds to an eighth stage S8.

At the eighth stage S8, the processor 25 judges whether or not the tone stop instruction signal is produced by the reset switch 22. As mentioned above, the tone stop instruction signal is produced when the reset switch 22 is closed to the on state by the possessor of the paging receiver 11. In other words, judgement is carried out at the eighth stage S8 whether or not the reset switch 22 is closed. When the tone stop instruction signal is not produced by the reset switch 22, the eighth stage S8 proceeds to a ninth stage S9 which will presently be described. When the tone stop instruction signal is not produced, the eighth stage S8 is succeeded by a tenth stage S10 which will later be described.

At the ninth stage S9, the processor 25 carries out judgement whether or not the first time-out signal is produced. When the judgement indicates a negative result, operation returns to the eighth stage S8. When the judgement indicates an affirmative result, the ninth stage S9 proceeds to an eleventh stage S11.

At the eleventh stage S11, the processor 25 writes the received signal in the first area 291 of the data memory 29 as a confirmation waiting call signal. As mentioned before, the confirmation waiting call signal is a received signal which is not yet confirmed by the possessor of the paging receiver 11. Exactly speaking, the received signal is written in the first area 291 of the data memory 29 as the confirmation waiting call signal when the possessor does not put the reset switch 22 into the on state until the first timer 281 produces the first time-out signal. Simultaneously, the processor 25 erases either the common call tone signal or the repeat call tone signal out of the second area 292 of the data memory 29 to make the tone generator stop generation of a pertinent one of the common tone and the repeat call tone. When such operation of the processor 25 comes to an end, operation returns to the first stage S1.

Description will proceed to the tenth stage S10. At the tenth stage S10, the processor 25 erases either the common call tone signal or the repeat call tone signal out of the second area 292 of the data memory 29 in response to the tone stop instruction signal which is produced by the reset switch 22 when the possessor put the reset switch 22 into the on state. Simultaneously, the processor 25 makes the tone generator stop generation of either the common tone or the repeat call tone.

Thus, the processor 25 serves in combination with the second area 292 of the data memory 29 as the controlling arrangement even at the tenth stage S10: In this event, the controlling arrangement is connected to the reset switch 22 to make the tone generator stop generation of the common tone in response to the tone stop instruction signal.

A twelfth stage S12 succeeds the tenth stage S10. It will be assumed in connection with the twelfth stage S12 that the received signal is a particular reception signal indicative of a particular one of the call numbers. At the twelfth stage S12, the processor 25 makes the arithmetic logic unit 31 process or classify the received signal into one of a plurality of individual tone signals which correspond to the call signals, respectively. As a particular tone signal, the above-mentioned one of the individual tone signals indicates reception of the particular reception signal. The particular tone signal is stored in the second area 292 of the data memory 29. In this manner, production of one of the individual tone signals is carried out at the twelfth stage S12.

Summarizing, the processor 25 serves in cooperation with the arithmetic logic unit 31 as the processing arrangement even at the twelfth stage S12. The processing arrangement is furthermore for classifying the received signal into one of a plurality of individual tone signals after the controlling arrangement makes the tone generator stop generation of the common tone in response to the tone stop instruction signal. The individual tone signals correspond to the call numbers, respectively. The above-mentioned one of the individual tone signals indicates reception of the particular reception signal as a particular tone signal.

The twelfth stage S12 is followed by a thirteenth stage S13. At the thirteenth stage S13, the processor 25 reads the particular tone signal out of the second area 292 of the data memory 29 to deliver the particular tone signal to the loudspeaker 20 through the first output port 35 and the driver circuit 21. As a result, the loudspeaker generates a particular one of the audible tones as a particular tone which indicates reception of the particular reception signal. That is, the particular tone indicates the call number of the particular reception signal. In this event, the processor 25 makes the tone generator generate the particular tone having a sound pressure level which is lower than the common tone by ten decibels.

Summarizing, the processor 25 acts, in combination with the second area 292 of the data memory 29 and the first output port 35, as the controlling arrangement even at the thirteenth stage S13. In this event, the controlling arrangement makes the tone generator generate a particular one of the audible tones as a particular tone in response to the particular tone signal. The particular tone indicates reception of the particular reception signal.

Turning once again to FIG. 4, first through fourth particular tones are illustrated along third through sixth of bottom lines, respectively. Each of the first through third particular tones has a prescribed period 2Pc which is equal to twice the predetermined period Pc of the common tone illustrated along the top line. The fourth particular tone has another prescribed period 4Pc which is equal to four times the predetermined period Pc of the common tone. The first through fourth particular tones have different patterns of the audible and the quiescent states in each time interval which is equal to the period 2Pc. In addition, each of the patterns of the first through fourth particular tones is different from those of the common tone and the repeat call tone.

By the first particular tone, the possessor of the paging receiver 11 (FIG. 1) can recognize a call received from, for example, an office for which the possessor serves. When the possessor confirms the second particular tone, the possessor can judge another call received from, for example, home.

Turning back to FIGS. 2 and 3, the thirteenth stage S13 is followed by a fourteenth stage S14. At the fourteenth stage S14, the processor 25 makes the second timer 282 start its operation when the processor 25 makes the tone generator generate the particular tone. The second timer 282 produces a second time-out signal when a second predetermined time duration lapses after operation of the second timer 282 is started. The second time duration is substantially longer than the first predetermined time duration of the first timer 281. The fourteenth stage S14 is succeeded by a fifteenth stage S15.

At the fifteenth stage S15, the processor 25 judges whether or not the tone stop instruction signal is produced by the reset switch 22. That is, judgement is carried out at the fifteenth stage S15 whether or not the reset switch 22 is closed to the on state by the possessor of the paging receiver 11. When the tone stop instruction signal is not produced by the reset switch 22, the fifteenth stage S15 proceeds to a sixteenth stage S16 which will presently be described. When the tone stop instruction signal is produced, the fifteenth stage S15 is followed by a seventeenth stage S17 which will later be described.

At the sixteenth stage S16, the processor 25 carries out judgement whether or not the second timer 282 produces the second time-out signal. When the judgement shows a negative result, operation turns back to the fifteenth stage S15. Otherwise, the fifteenth stage S15 is followed by the seventeenth stage S17.

At the seventeenth stage S17, the processor 25 erases the particular tone signal out of the second area 292 of the data memory 29 in response to either the tone stop instruction signal or the second time-out signal. At the same time, the processor 25 makes the tone generator stop generation of the particular tone.

Summarizing, the processor 25 acts in the second area 292 of the data memory 29 as the controlling arrangement even at the seventeenth stage S17. In this event, the controlling arrangement makes the tone generator stop generation of the particular tone in response to the tone stop instruction signal which is produced after generation of the particular tone.

Reviewing FIGS. 1, 2, and 3, description will now be made as regards merits of this invention. According to this invention, the paging receiver 11 generates a common call tone at first to indicate arrival of any one of call signals when the paging receiver 11 receives the call signal as a received signal. After generation of the common tone, a particular tone is generated to indicate the call number of the received signal in question. Inasmuch as a call tone is divided into the common call tone and the particular tone, the possessor of the paging receiver can immediately understand arrival of the call signals by hearing the common call tone. Therefore, the possessor can immediately stop generation of the common tone by manual operation of the reset switch 22. After the operation of the reset switch 22, the particular tone is generated as a comparatively quiet tone.

Thus, the paging receiver 11 is capable of generating the call tone without giving any trouble to those around the paging receiver 11. In the paging receiver 11, a short time interval is sufficient to indicate arrival of one of the call signals even for an increased number of the call numbers indicated by the respective call signals. In addition, the paging receiver 11 is capable of carrying out indication of the call numbers of the call signals by using comparatively quiet tones.

While this invention has thus far been described in conjunction with a single embodiment thereof, it will readily be possible for those skilled in the art to put this invention into practice in various other manners. For example, this invention is applicable to a radio paging receiver comprising a visual display unit for displaying messages carried by a message signal which succeeds a call signal.

What is claimed is:

1. A radio communication apparatus for selectively receiving a plurality of call signals indicative of a plurality of call numbers, respectively, which are assigned to said radio communication apparatus, said radio communication apparatus comprising:

a memory unit for memorizing said call numbers as a memorized content;

receiving means connected to said memory unit for receiving each of said call signals as a received signal with reference to said memorized content;

processing means connected to said receiving means for processing said received signal into a common call tone signal representative of reception of said received signal irrespective of one of said call numbers that is indicated by said received signal;

tone generating means for generating a plurality of audible tones; and controlling means connected to said processing means for controlling said tone generating means in response to said common call tone signal to make said tone generating means generate one of said audible tones that indicates reception of said received signal as a common tone;

said receiving means producing said received signal as a particular reception signal in response to one of said call signals that indicates one of said call numbers;

said processing means being furthermore for classifying said received signal into one of a plurality of individual tone signals after said controlling means makes said tone generating means generate said common tone in response to said common call tone signal, said individual tone signals corresponding to said call numbers, respectively, said one of the individual tone signals indicating the call number of said particular reception signal;

said controlling means making said tone generating means generate a particular one of said audible tones as a particular tone in response to said one of the individual tone signals, said particular tone indicating the call number of said particular reception signal and having a sound pressure level which is lower than a sound pressure level of said common tone.

2. A radio communication apparatus as claimed in claim 1, further comprising:

a switch for producing a tone stop instruction signal;

said controlling means being connected to said switch to make said tone generating means stop generation of said common tone in response to said tone stop instruction signal after said controlling means makes said tone generating means generate said common tone.

3. A radio communication apparatus as claimed in claim 2, wherein:

said processing means classifies said received signal into said one of the individual tone signals after said control means makes said tone generating means stop generation of said common tone in response to said tone stop instruction signal.

4. A radio communication apparatus as claimed in claim 3, wherein said controlling means makes said tone generating means stop generation of said particular tone in response to said tone stop instruction signal produced after generation of said particular tone.

5. A radio communication apparatus as claimed in claim 3, further comprising:

a memory for memorizing a confirmation waiting call signal which is already received by said receiving means as a preceding received signal and which is not yet confirmed by a possessor of said apparatus; and judging means, connected to said receiving means and said memory, for judging whether or not said received signal is said confirmation waiting call signal to produce a judgment result;

said processing means being connected to said judging means to process said received signal into said common call tone signal when said judgment result represents that said received signal is not said confirmation waiting call signal.

6. A radio communication apparatus as claimed in claim 5, wherein:

said processing means processes said received signal into a repeat call tone signal representative of repeated reception of said received signal regardless of said call number of said received signal when said judgment result represents that said received signal is said confirmation waiting call signal; and said controlling means controls said tone generating means in response to said repeat call tone signal to cause said tone generating means to generate a particular one of said audible tones as a repeat call tone which indicates repeated reception of said received signal.

7. A radio communication apparatus as claimed in claim 6, wherein:

said controlling means is connected to said receiving means and said memory to store said received signal in said memory as said confirmation waiting call signal and to control said tone generating means to stop generation of said common call tone when said controlling means does not receive said tone stop instruction signal a predetermined time after said controlling means controls said tone generating means to generate said common tone.

* * * * *